United States Patent
Rastogi

(10) Patent No.: US 9,501,419 B2
(45) Date of Patent: Nov. 22, 2016

(54) APPARATUS, SYSTEMS, AND METHODS FOR PROVIDING A MEMORY EFFICIENT CACHE

(71) Applicant: HGST Netherlands B.V., Amsterdam (NL)

(72) Inventor: Kanishk Rastogi, Maharashtra (IN)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 14/509,597

(22) Filed: Oct. 8, 2014

(65) Prior Publication Data

US 2016/0103765 A1  Apr. 14, 2016

(51) Int. Cl.
 *G06F 12/08* (2016.01)
 *G06F 9/46* (2006.01)

(52) U.S. Cl.
 CPC .......... *G06F 12/0893* (2013.01); *G06F 9/467* (2013.01); *G06F 2212/225* (2013.01)

(58) Field of Classification Search
 None
 See application file for complete search history.

(56) References Cited

U.S. PATENT DOCUMENTS

| | | | |
|---|---|---|---|
| 8,645,626 B2 | 2/2014 | Mittendorff et al. | |
| 2011/0010502 A1* | 1/2011 | Wang | G06F 12/121 711/128 |
| 2011/0093654 A1* | 4/2011 | Roberts | G06F 1/3203 711/105 |
| 2012/0089781 A1* | 4/2012 | Ranade | G06F 17/30203 711/118 |
| 2012/0133984 A1* | 5/2012 | Hayakawa | G06F 3/1211 358/1.16 |
| 2012/0137059 A1 | 5/2012 | Yang et al. | |
| 2013/0111146 A1 | 5/2013 | Ash et al. | |
| 2013/0185478 A1 | 7/2013 | Ash et al. | |
| 2013/0242425 A1* | 9/2013 | Zayas | G11B 5/012 360/15 |
| 2013/0262742 A1 | 10/2013 | Park et al. | |
| 2014/0019688 A1 | 1/2014 | Ghodsnia et al. | |
| 2014/0067990 A1* | 3/2014 | Abdelhameed | G06F 17/30902 709/213 |
| 2014/0082297 A1* | 3/2014 | Solihin | G06F 12/082 711/136 |

FOREIGN PATENT DOCUMENTS

CN    103150136 A    6/2013

OTHER PUBLICATIONS

Klonatos, et al., "Azar: Using Two-Level Block Selection to Improve SSD-Based I/O Caches", 6th IEEE International Conference on Networking, Architecture and Storage (NAS), Jul. 28-30, 2011, Dilian, Liaoning, pp. 309-318, 10 pages.

* cited by examiner

*Primary Examiner* — Kevin Verbrugge
(74) *Attorney, Agent, or Firm* — Wilmer Cutler Pickering Hale and Dorr LLP

(57) ABSTRACT

The present disclosure relates to apparatus, systems, and methods that implement a less-recently-used data eviction mechanism for identifying a memory block of a cache for eviction. The less-recently-used mechanism can achieve a similar functionality as the least-recently-used data eviction mechanism, but at a lower memory requirement. A memory controller can implement the less-recently-used data eviction mechanism by selecting a memory block and determining whether the memory block is one of the less-recently-used memory blocks. If so, the memory controller can evict data in the selected memory block; if not, the memory controller can continue to select other memory blocks until the memory controller selects one of the less-recently-used memory blocks.

17 Claims, 5 Drawing Sheets

| 2 billion data blocks W=0.01 | |
|---|---|
| No. of queries | Probability |
| 100 | 0.633967667 |
| 200 | 0.866020338 |
| 300 | 0.950959116 |
| 400 | 0.982049453 |
| 500 | 0.993429521 |
| 600 | 0.997594993 |
| 700 | 0.99911969 |
| 800 | 0.999677778 |
| 900 | 0.999882056 |
| 1000 | 0.999956829 |

FIG. 2

APPARATUS, SYSTEMS, AND METHODS FOR PROVIDING A MEMORY EFFICIENT CACHE

BACKGROUND

1. Field of the Disclosure

The present disclosure relates to apparatus, systems, and methods for providing a memory efficient cache.

2. Related Disclosure

A computer system can include a storage system that can maintain data. A storage system can include one or more types of storage devices such as, for example, hard disk drives (HDDs) and optical drives. These types of storage devices are inexpensive and can hold large amount of data. However, they are slow compared to other components used in a computing system. For example, a consumer hard drive can store terabytes of data cheaply, but has a maximum theoretical transfer rate of 300 megabytes (MB) per second.

Other types of storage devices are faster compared to HDDs and optical drives. For example, a random access memory (RAM) has a maximum theoretical transfer rate of, for example, 12.8 gigabytes (GB) per second. Even a solid state drive (SSD) is faster than the HDDs and optical drives. However, these devices tend to be more expensive.

Some integrated memory devices can be even faster than RAMs or SSDs. For example, specialized on-chip memory in a central processing unit (CPU) can exhibit even better performance, with a transfer rate of 16 GB per second, or over fifty times faster than off-chip storage devices. However, on-chip memory is often extremely expensive.

Because memory devices exhibit this tradeoff between price and performance, a technique known as caching may be used to increase, or accelerate, the overall performance of a storage system. Caching is based on an observation that the same data may be used over and over again within a short period of time by a host device, such as a software application and/or an operating system running on the host device, or by another hardware component. Therefore, a storage system can use a small amount of fast-access memory (referred to as a cache) to store the regularly accessed data so that the regularly accessed data can be readily provided to computing systems.

SUMMARY

Embodiments of the present disclosure relate to apparatus, systems, and methods for providing a memory-efficient cache using a solid state drive.

Some embodiments include a method. The method can include receiving, at a memory controller in a storage system coupled to a host device via an interface, a memory access request, wherein the memory access request comprises a memory block identifier that identifies a memory block. The method can also include determining, at the memory controller, that data associated with the memory access request should be stored in one of memory blocks in the cache and that each of the memory blocks in the cache is already occupied with valid data. The method can also include selecting, by the memory controller, one of the memory blocks, and determining a first transaction count associated with the selected memory block, wherein the first transaction count is indicative of a time instance at which the selected memory block was accessed. When the first transaction count satisfies a predetermined criterion, the method can include causing, by the memory controller, the selected memory block to store the data. When the first transaction count does not satisfy the predetermined criterion, the method can include selecting, by the memory controller, another one of the memory blocks until the memory controller selects a memory block whose transaction count satisfies the predetermined criterion.

In some embodiments, selecting the one of the memory blocks can include selecting a memory block identifier using a random number generator.

In some embodiments, the method can also include maintaining a transaction count threshold, and wherein the first transaction count satisfies the predetermined criterion when the first transaction count satisfies a predetermined condition with respect to the transaction count threshold.

In some embodiments, the first transaction count satisfies the predetermined condition with respect to the transaction count threshold when the first transaction count is less than the transaction count threshold.

In some embodiments, when an average number of iterations used for identifying the selected memory block is small, the method can include causing a modification of the transaction count threshold to reduce a number of memory blocks that satisfy the predetermined criterion.

In some embodiments, the method can include maintaining a transaction count list having at least one entry, wherein the at least one entry is indicative of a number of memory blocks having a transaction count that is within a preconfigured range; and determining the transaction count threshold based on the number of memory blocks having a transaction count that is within the preconfigured range.

In some embodiments, the method can include receiving a parameter indicative of a number of memory blocks that satisfy the predetermined criterion; and determining the preconfigured range based on the parameter.

In some embodiments, the method can include receiving, at the memory controller, a first memory access request, wherein the first memory access request comprises a first memory block identifier that identifies a first memory block; determining, at the memory controller, that data associated with the first memory access request is already stored in one of memory blocks in the cache; and updating a transaction count of the one of memory blocks in the cache to reflect the first memory access request.

In some embodiments, the method can include identifying an entry of the transaction count list associated with the first memory block, and updating the number of memory blocks in the entry to reflect the first memory access request.

Some embodiments include a storage system. The storage system can include a cache comprising a plurality of memory blocks for maintaining data, and a memory controller configured to process a memory access request received from a host device, wherein the memory access request comprises a memory block identifier that identifies a memory block. The memory controller can be configured to determine that data associated with the memory access request should be stored in one of memory blocks in the cache and that each of the memory blocks in the cache is already occupied with valid data, select one of the memory blocks in the cache, and determine a first transaction count associated with the selected memory block, wherein the first transaction count is indicative of a time instance at which the selected memory block was accessed. When the first transaction count satisfies a predetermined criterion, the memory controller can be configured to cause the selected memory block to store the data. When the first transaction count does not satisfy the predetermined criterion, the memory controller can be configured to select another one of the memory blocks until the memory controller selects a memory block whose transaction count satisfies the predetermined criterion.

In some embodiments, the memory controller is configured to select a memory block identifier using a random number generator.

In some embodiments, the memory controller is configured to maintain a transaction count threshold, and wherein the first transaction count satisfies the predetermined criterion when the first transaction count satisfies a predetermined condition with respect to the transaction count threshold.

In some embodiments, when an average number of iterations used for identifying the selected memory block is small, the memory controller is configured to cause a modification of the transaction count threshold to reduce a number of memory blocks that satisfy the predetermined criterion.

In some embodiments, the memory controller is configured to: maintain a transaction count list having at least one entry, wherein the at least one entry is indicative of a number of memory blocks having a transaction count that is within a preconfigured range; and determine the transaction count threshold based on the number of memory blocks having a transaction count that is within the preconfigured range.

In some embodiments, the memory controller is configured to receive a parameter indicative of a number of memory blocks that satisfy the predetermined criterion; and determine the preconfigured range based on the parameter.

In some embodiments, the memory controller is configured to receive a first memory access request, wherein the first memory access request comprises a first memory block identifier that identifies a first memory block, determine that data associated with the first memory access request is already stored in one of memory blocks in the cache, and update a transaction count of the one of memory blocks in the cache to reflect the first memory access request.

Some embodiments include a non-transitory computer readable medium having executable instructions. The executable instructions can be operable to cause a memory controller to receive a memory access request from a host device over an interface, wherein the memory access request comprises a memory block identifier that identifies a memory block, determine that data associated with the memory access request should be stored in one of memory blocks in the cache and that each of the memory blocks in the cache is already occupied with valid data, and select one of the memory blocks in the cache. The executable instructions can also be operable to cause the memory controller to determine a first transaction count associated with the selected memory block, wherein the first transaction count is indicative of a time instance at which the selected memory block was accessed. When the first transaction count satisfies a predetermined criterion, the executable instructions can also be operable to cause the memory controller to cause the selected memory block to store the data. When the first transaction count does not satisfy the predetermined criterion, the executable instructions can also be operable to cause the memory controller to select another one of the memory blocks until the memory controller selects a memory block whose transaction count satisfies the predetermined criterion.

In some embodiments, the non-transitory computer readable medium can also include executable instructions operable to cause the memory controller to maintain a transaction count threshold, and wherein the first transaction count satisfies the predetermined criterion when the first transaction count satisfies a predetermined condition with respect to the transaction count threshold.

In some embodiments, the non-transitory computer readable medium can also include executable instructions operable to cause the memory controller to maintain a transaction count list having at least one entry, wherein the at least one entry is indicative of a number of memory blocks having a transaction count that is within a preconfigured range, and determine the transaction count threshold based on the number of memory blocks having a transaction count that is within the preconfigured range.

In some embodiments, the non-transitory computer readable medium can also include executable instructions operable to cause the memory controller to receive a first memory access request, wherein the first memory access request comprises a first memory block identifier that identifies a first memory block, determine that data associated with the first memory access request is already stored in one of memory blocks in the cache, and update a transaction count of the one of memory blocks in the cache to reflect the first memory access request.

BRIEF DESCRIPTION OF THE FIGURES

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

FIG. 2 illustrates a probability of finding one of the less recently used memory blocks through random queries as a function of the number of random queries.

DETAILED DESCRIPTION

Figure 1:
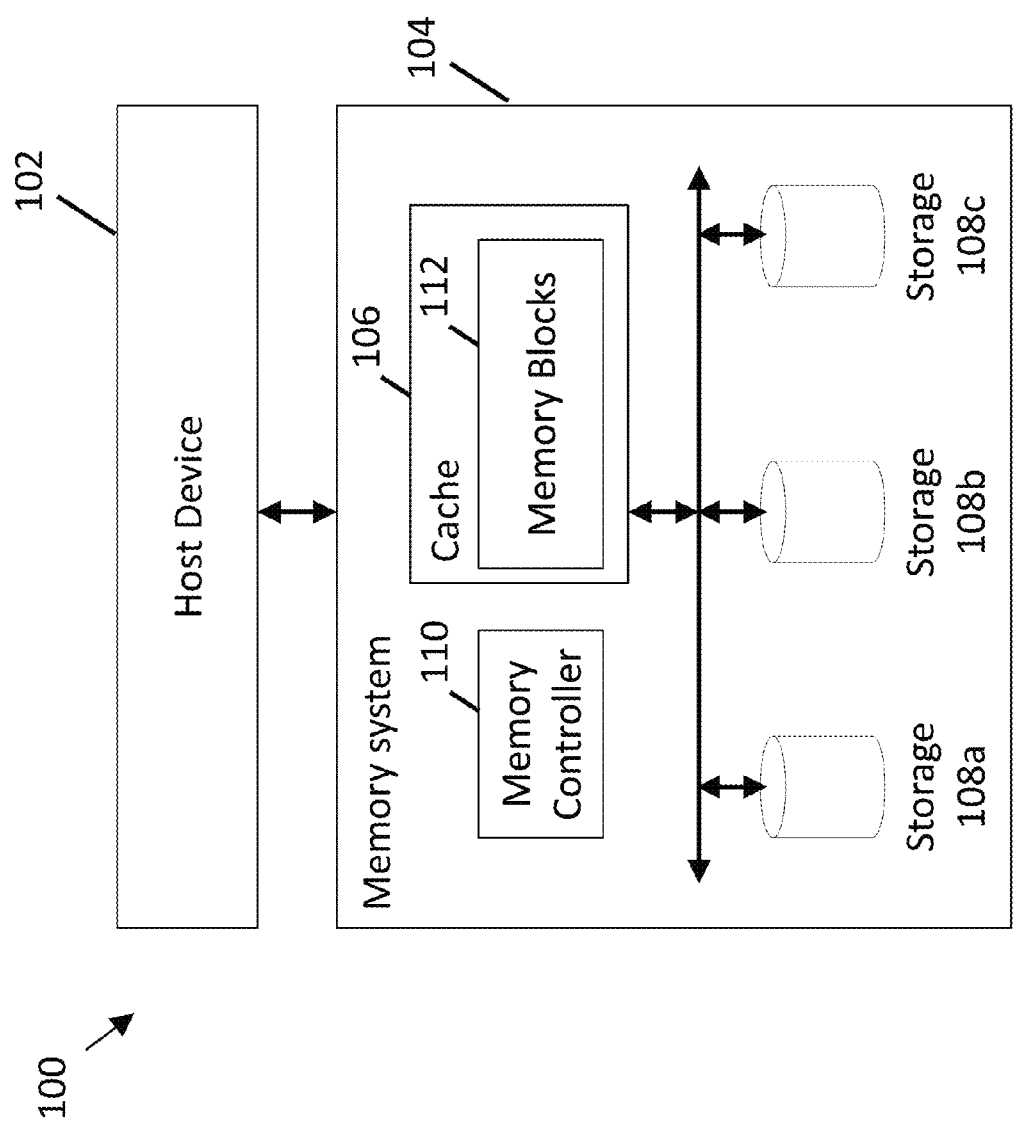
FIG. 1 illustrates an exemplary computing system 100 having a storage system in accordance with some embodiments of the present disclosure.

A cache can be used to improve the average data access time in a storage system. However, a cache can cause a large amount of memory overhead because a cache requires not only memory blocks for storing data, but also a memory controller that coordinates memory access operations for the memory blocks in the cache.

A memory controller is often configured to ensure that data stored in memory blocks are used as often as possible. To this end, a memory controller can be configured to determine which one of the memory blocks was least recently used (e.g., the memory block that has not been accessed for the longest time,) and cause data in that least recently used memory block to be over-written by new data that would likely be used more often. This feature is called the least-recently-used (LRU) data eviction mechanism.

Oftentimes, a memory controller implements the LRU data eviction mechanism using a double linked list. For example, a memory controller can maintain a double linked list that includes nodes representing memory blocks in a cache. The nodes in the double linked list are ordered according to the time at which the associated memory blocks were last read or written into. Therefore, the memory controller can access the last node in the double linked list to quickly identify the memory block that was least recently accessed.

This mechanism, however, can require a significant amount of memory because the memory controller has to maintain a double linked list having the same number of nodes as the number of memory blocks, which can be in the order of billions (e.g., 2 billion memory blocks for a cache of 8 TB having the memory block size of 4 KB.) Since each node in the double linked list can consume 16 bytes, the total number of bytes needed to maintain the double linked list can be tens of billions, which is significant. Considering that the double linked list is implemented using fast-access memory, such as static random access memory (SRAM), the cost associated with the LRU data eviction mechanism can be high.

The present disclosure shows a modified LRU data eviction mechanism (also referred to as the "modified LRU mechanism") that can achieve a similar functionality as the traditional LRU data eviction mechanism (also referred to as the "traditional LRU mechanism"), but at a substantially lower memory requirement. More particularly, the present disclosure shows a memory controller that is configured to evict data from one of the less recently used memory block, as opposed to the least recently used memory block. For example, suppose that a cache has 10 memory blocks, 8 of which were accessed less than 100 clock cycles ago, one of which was accessed 150 clock cycles ago, and one of which was accessed 160 cycles ago. The traditional LRU mechanism would select the memory block that was accessed 160 cycles ago. In contrast, the modified LRU mechanism can be designed to select one of the less recently used memory blocks. Therefore, the memory controller, using the modified LRU mechanism, can select either the memory block that was accessed 150 clock cycles ago or the one that was accessed 160 cycles ago. When a number of less recently used memory blocks (also referred to as "target memory blocks") is small compared to the number of memory blocks 112 in the cache 106, the functionality of the modified LRU mechanism can be substantially similar to the functionality of the traditional LRU mechanism.

In some embodiments, the memory controller is configured to maintain an input/output stamp ("IOStamp") for each memory block in the cache. The IOStamp can be indicative of an order at which memory blocks were accessed. For example, a memory block associated with a lower IOStamp can be less recently accessed compared to a memory block associated with a higher IOStamp.

The memory controller can also maintain an IOStampThreshold. The IOStampThreshold can be used to identify target memory blocks (e.g., memory blocks whose data can be evicted to accommodate new data) from the pool of memory blocks in the cache. For example, when a memory block is associated with an IOStamp that is lower than the IOStampThreshold, the memory controller can determine that the memory block is a target memory block, and can evict data in that memory block to make room for new data.

The memory controller can use the IOStamp and the IOStampThreshold to identify target memory blocks from the cache. When the memory controller decides to write new data into the cache and all memory blocks in the cache are occupied, then the memory controller can select one of the target memory blocks in the cache, evict data from the selected target memory block, and write the new data into the selected target memory block.

To select one of the target memory blocks in the cache, the memory controller can randomly select a memory block and determine an IOStamp of the randomly selected memory block. If the determined IOStamp is lower than the IOStampThreshold, the memory controller can indicate that the selected memory block can be used for the new data. On the other hand, if the determined IOStamp is higher than the IOStampThreshold, then the memory controller can ignore that memory block, randomly select a new memory block, and iterate this process until the randomly selected memory block has an IOStamp that is lower than the IOStampThreshold.

In some embodiments, the memory controller can maintain an IOStamp list. The IOStamp list can include a linked list. The linked list can include a plurality of nodes, each node indicating a number of memory blocks associated with an IOStamp within a preconfigured range. For example, suppose $L_0, L_1, \ldots, L_{n-1}, L_n$ are real numbers. The first node in an IOStamp list can indicate a number of memory blocks having the IOStamp within the range of $0 \le IOStamp < L_0$; the second node in an IOStamp list can indicate a number of memory blocks having the IOStamp within the range of $L_0 \le IOStamp < L_1$; ...; and the $(n+1)^{th}$ node in an IOStamp list can indicate a number of memory blocks having the IOStamp within the range of $L_{n-1} \le IOStamp < L_n$.

In some embodiments, when an IOStamp of a memory block is updated, the memory controller can correspondingly update the IOStamp list so that the IOStamp list maintains up-to-date information on the number of memory blocks associated with an IOStamp within a preconfigured range. In some embodiments, the IOStamp list can be ordered in such a way that, for example, the first node in the list is associated with the lowest range of IOStamps and the last node in the list is associated with the highest range of IOStamps.

In some embodiments, the memory controller can use the IOStamp list to set the IOStampThreshold so that a ratio W between the number of target memory blocks and the total number of memory blocks in the cache is fixed. For example, the memory controller can determine the number of memory blocks with IOStamps in the lowest range of IOStamps (e.g., $0 \le IOStamp < L_1$), and use that information to determine the IOStampThreshold so that the number of memory blocks having IOStamp less than the IOStampThreshold is roughly equal to the W times the total number of memory blocks in the cache.

In some cases, the ratio W can be predetermined by a user; in other cases, this ratio W can be automatically set by the memory controller based on the number of iterations needed to select a target memory block.

The modified LRU mechanism has a significant advantage in the memory usage compared to the traditional LRU mechanism. Instead of 16 bytes per data block needed for maintaining the double linked list for the traditional LRU mechanism, the memory controller can implement the modified LRU mechanism using as little as 4 bytes per memory block since the memory controller only needs to maintain the IOStamp per memory block. Therefore, the memory controller can implement the modified LRU mechanism while consuming only about 25% of the memory needed for the traditional LRU mechanism.

FIG. 1 illustrates an exemplary computing system 100 having a storage system in accordance with some embodiments of the present disclosure. The computing system 100 can include a host device 102 and a storage system 104, where the storage system 104 includes a cache 106, a memory controller 110, and one or more storage devices 108a-108c. The cache 106 can, in turn, include a plurality of memory blocks 112 for maintaining data. Each of the memory blocks 112 in the cache can have a fixed size. For example, a memory block 112 in the cache 106 can be 4 KB long. The one or more storage devices 108a-108c can also include a plurality of memory blocks for maintaining data. In some embodiments, the memory controller 110 can reside in the cache 106.

The host device 102 can include any computer system that uses and accesses a storage system 104 for data read and data write operations. Such a host device 102 may run applications such as databases, file systems, and web services. In some embodiments, the host device 102 can be physically co-located with (e.g., located physically close to) the storage system 104. In such embodiments, the host device 102 can be configured to communicate with the storage system 104 via a bus. The bus can include, for example, PCI, PCI-Express, PCI-X, InfiniBand, Hyper-Transport, SCSI PCI-E card, SATA PCI-E card, iSCSI adaptor card, and Fibre Channel PCI-E card. In other embodiments, the host device 102 can be physically separated from the storage system 104. In such embodiments, the host device 102 can communicate with the storage system 104 via a communication network. The network can include the Internet, a local area network (LAN), a packet data network, a legacy network, or any type of network that is capable of providing data communication between the host device 102 and the storage system 104.

The cache 106 can include a memory device with fast access time. In some embodiments, the fast-access memory device in the cache 106 can include a static random access memory (SRAM).

In other embodiments the fast-access memory device in the cache 106 can include a solid state drive (SSD), which may include any solid state-based memory devices such as NAND gate flash memory, NOR gate flash memory, phase change memory (PCM), or any nonvolatile solid state memory having the properties of, for example, fast access time.

In some embodiments, a memory controller 110 is implemented in hardware. The hardware can include logic circuits and/or memory for selecting target memory blocks and for evicting data from the selected target memory blocks to accommodate new data. In some embodiments, the hardware for the memory controller 110 can be implemented using a hardware description language including Verilog, VHSIC hardware description language (VHDL), and BlueSpec™ (Bluespec Inc., Framingham, Mass.), and be synthesized using logic synthesis tools including Design Compiler® (Synopsis Inc., Mountain View, Calif.), Encounter RTL compiler (Cadence Design Systems Inc., San Jose, Calif.), RealTime Designer (Oasys Design Systems, Inc., Santa Clara, Calif.), and BooleDozer (International Business Machine, Endicott, N.Y.).

In some embodiments, a memory controller 110 is implemented as a part of firmware. As discussed further below, the firmware can allocate a memory space for maintaining an IOStamp table and an IOStamp list, and can further include instructions operable to determine a memory block for eviction based on the modified LRU mechanism.

In some embodiments, the memory controller 110 can be implemented in software using memory such as a non-transitory computer readable medium, a programmable read only memory (PROM), or flash memory. The software can run on a processor, which may reside in the memory controller 110, that executes instructions or computer code, which can be embodied in a non-transitory computer readable medium embodied in the memory controller 110.

In some embodiments, the storage device 108 can be implemented using hard disk drives (HDDs). In other embodiments, the storage device 108 can also be implemented using nonvolatile RAM (NVRAM), a microelectromechanical systems (MEMS) storage, or a battery backed dynamic random access memory (DRAM).

The host device 102 can be configured to transmit read and write requests to the storage system 104, which can be received at the memory controller 110. Subsequently, the memory controller 110 can process the requests to read and write data to and from the associated storage devices 108a-108c. For example, to process a read request, the memory controller 110 can determine whether data corresponding to a requested memory address is stored one or more of the memory blocks 112 in the cache 106 (i.e., whether the requested memory address is cached.). If the requested memory address is cached, this situation can sometimes be referred to as a "read hit." If the requested memory address is not cached, this situation can be referred to as a "read miss." Upon a read hit, the memory controller 110 can return the requested data faster directly from memory blocks 112. In contrast, upon a "read miss," the memory controller 110 can retrieve the requested data from one or more of the slower storage devices 108, and optionally, store the retrieved data in one of the empty memory blocks 112 in the cache 106.

Similarly, to process a write request, the memory controller 110 can determine whether a requested memory address is already stored in one or more memory blocks 112 in the cache 106. If the requested memory address is cached, this situation can sometimes be referred to as a "write hit." If the requested memory address is not cached, this situation can be referred to as a "write miss." Upon a write hit, the cache 106 can update itself as well as the slower storage devices 108 to reflect the new data for the requested memory address; upon a write miss, the cache 106 can update the slower storage devices 108 to reflect the new data for the requested memory address.

As discussed above, when there is a read miss, the cache 106 may store the data from the requested memory address in one of the empty memory blocks in the cache 106. However, when all memory blocks in the cache are full, the cache 106 has to evict (or remove) data in one of the memory blocks to make room for the new data.

To improve the efficiency, in some embodiments, the memory controller 110 can be configured to evict one of the less recently used memory blocks, as opposed to a random memory block in the cache 106. This mechanism for selecting a memory block for eviction is referred to as the less recently used mechanism. When the number of less recently used memory blocks, also referred to as the target memory blocks, is small compared to the total number of memory blocks, then the performance of the less recently used mechanism can be substantially similar to the performance of the least recently used mechanism. The ratio of the number of target memory blocks and the total number of memory blocks can be referred to as W. In some embodiments, W is set to be less than or equal to 0.01.

To implement the less recently used mechanism ("modified LRU mechanism"), the memory controller 110 is configured to maintain an IOStamp table. The IOStamp table includes the same number of entries as the number of memory blocks 112. Each entry in the IOStamp table corresponds to a particular memory block in the cache, and can indicate the IOStamp associated with that particular memory block, which, as discussed above, can indicate an order in which the memory blocks were accessed. The memory controller 110 can be configured to update the IOStamp table as memory blocks 112 are accessed so that the most recently accessed memory block has an IOStamp that is at least as high as the IOStamp of other memory blocks.

When the memory controller 110 receives a data request from a host device 102, the memory controller 110 can determine whether the requested data is stored in one or more memory blocks 112. If the requested data is stored in one or more memory blocks 112, the memory controller 110 can retrieve the data from the one or more memory blocks 112 and provide the retrieved data to the host device 102. If the requested data is not stored in one or more memory blocks 112, the memory controller 110 can retrieve the requested data from one or more storage devices 108, and, optionally, store this new data in one or more memory blocks 112 in the cache 106.

To determine which of the memory blocks 112 should maintain the new data, the memory controller 110 is configured to randomly query entries in the IOStamp table until the memory controller 110 identifies an entry having an IOStamp lower than a predetermined IOStampThreshold. For example, the memory controller 110 can use a random number generator to randomly generate a number corresponding to a memory block identifier. The memory controller 110 can use the memory block identifier to query the entry in the IOStamp table corresponding to the memory block identifier, thereby determining the IOStamp associated with the randomly selected memory block identifier.

Subsequently, the memory controller 110 can compare the determined IOStamp with the IOStampThreshold. If the IOStamp associated with the queried entry is higher than the predetermined IOStampThreshold, the memory controller 110 can query another random entry in the IOStamp table and iterate the process. However, if the IOStamp associated with the queried entry is less than or equal to the predetermined IOStampThreshold, then the memory controller 110 can select the memory block associated with the queried entry, evict data from the selected memory block, and write, into the selected memory block, the new data retrieved from one or more storage devices 108.

Mathematically speaking, when the total number of memory blocks is 2 billion and the ratio of the number of the target memory blocks to the total number of memory blocks is 0.01, the probability of finding one of the target memory blocks through random queries is high even with small number of queries. FIG. 2 illustrates a probability of finding one of the target memory blocks through random queries as a function of the number of random queries. As shown in FIG. 2, even with 500 queries, the probability of finding one of the target memory blocks is greater than 99%.

The modified LRU mechanism can use several variables to maintain an updated IOStamp table and to update the IOStampThreshold so that the number of target memory blocks is WZ, where W is the desired ratio of the number of target memory blocks to the total number of memory blocks, and Z is the total number of memory blocks 112 in the cache 106.

The modified LRU mechanism can use one or more of the following variables: IOCounter, GlobalIncrementalTag, BumpupCounter, and IOStamp list.

In some embodiments, the IOCounter indicates a number of input/output operations handled by the memory controller 110 since the time the IOCounter was reset, and the BumpUpCounter indicates a number of input/output operations to be handled by the memory controller 110 before resetting the IOCounter to 0. Every time the IOCounter reaches the BumpUpCounter, the memory controller 110 can increase the GlobalIncrementalTag by one.

In some embodiments, the memory controller 110 can use the GlobalIncrementalTag to assign an IOStamp to memory blocks. For example, when a new input/output operation is received, the memory controller 110 can assign an IOStamp having the value of the GlobalIncrementalTag to the memory block associated with that new input/output operation, as described further below.

In some embodiments, IOStamps of memory blocks can be stored in an IOStamp table. As discussed briefly above, the IOStamp table can include the same number of entries as the number of memory blocks 112 in the cache 106, and each entry in the IOStamp table can maintain an IOStamp of the memory block associated with the entry.

In some embodiments, the memory controller 110 can maintain an IOStamp list that is designed to indicate a number of memory blocks having an IOStamp that is within a preconfigured range. An IOStamp list can include one or more nodes, and each node of the IOStamp list can maintain at least two variables: (1) an IOStamp and (2) NoOfBlocks. For example, suppose that an IOStamp list is an array of five nodes, referenced as I[i], i=0 . . . 4, and variables in the respective node are referenced using a dot operator: I[i].IOStamp and I[i].NoOfBlocks. Then I[i].NoOfBlocks can be associated with the number of memory blocks 112 having the IOStamp between (I[i−1].IOStamp+1) and I[i].IOStamp, inclusive of both. In the boundary case of the first node I[0] in the IOStamp list, I[0].NoOfBlocks can indicate the number of memory blocks having an IOStamp less than or equal to I[0].IOStamp.

For example, suppose $L_0, L_1, \ldots, L_{n-1}, L_n$ are real numbers. The I[0].NoOfBlocks can indicate a number of memory blocks having the IOStamp within the range of $0 \leq IOStamp < L_0$; the I[1].NoOfBlocks can indicate a number of memory blocks having the IOStamp within the range of $L_0 \leq IOStamp < L_1$; . . . ; and I[n].NoOfBlocks can indicate a number of memory blocks having the IOStamp within the range of $L_{n-1} \leq IOStamp < L_n$, where $L_0$=I[0].IOStamp, $L_1$=I[1].IOStamp, . . . $L_{n-1}$=I[n−1].IOStamp, and $L_n$=I[n].IOStamp. Since the length of the IOStamp list depends on the number of distinct IOStamp ranges, the length of the IOStamp list can be much shorter than the total number of memory blocks 112 in the cache 106.

In some embodiments, the memory controller 110 is configured to update the IOCounter, GlobalIncrementalTag, BumpupCounter, and IOStamp list as the memory controller handles memory access requests. This way, the memory controller 110 can accurately describe the current status of the cache system using the IOCounter, GlobalIncrementalTag, BumpupCounter, and IOStamp list, and use these updated variables to select one of the target memory blocks for write operations. The process in which the memory controller 110 updates the IOCounter, GlobalIncrementalTag, BumpupCounter, and IO Stamp list in accordance with some embodiments is disclosed in FIGS. 3A-3B; the process in which the memory controller 110 uses these updated variables to select a target memory block for write operations in accordance with some embodiments is disclosed in FIG. 4.

Figure 3A:
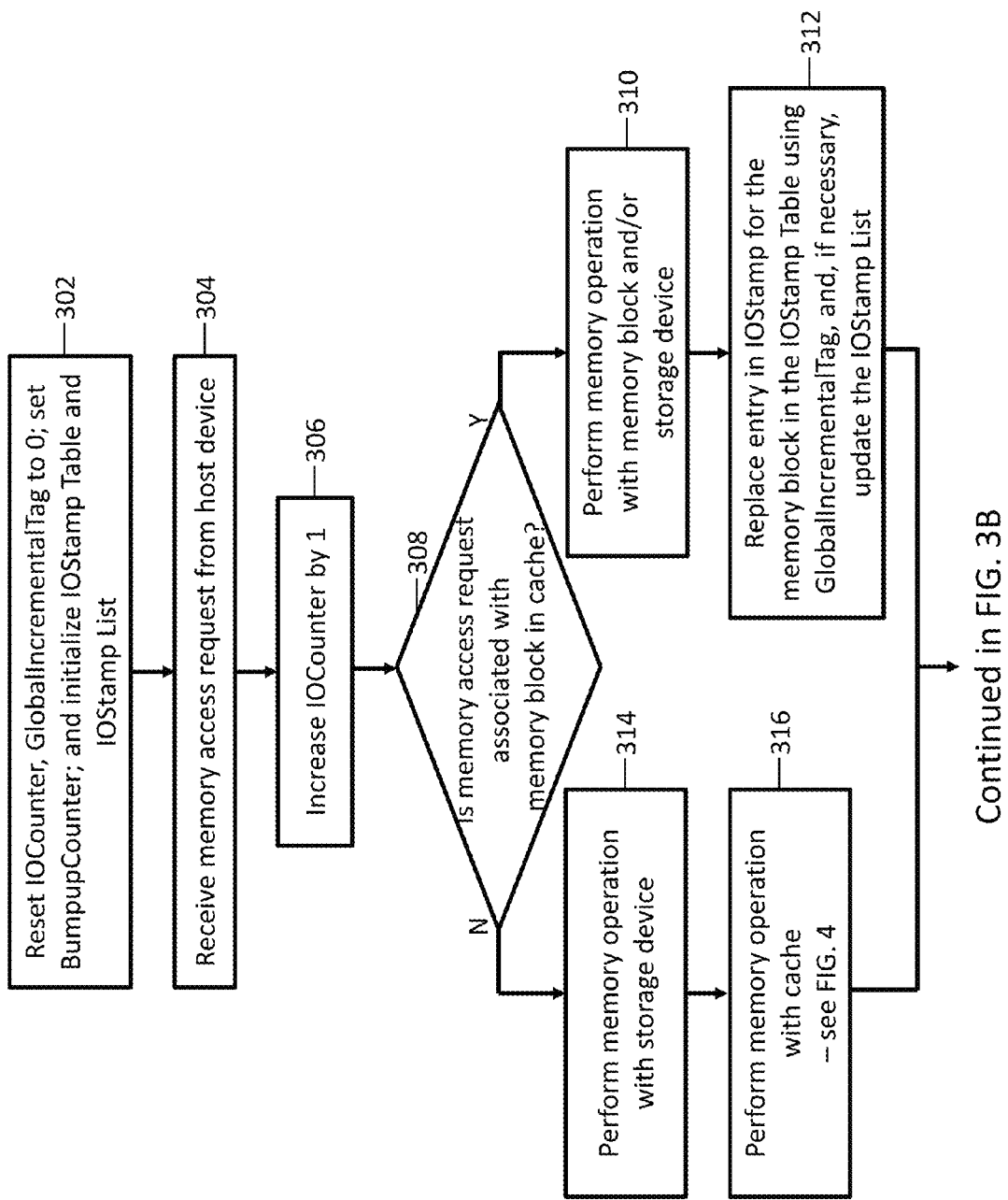
FIGS. 3A-3B illustrate a process in which a memory controller handles a memory access request in accordance with some embodiments of the present disclosure.
Figure 3B:
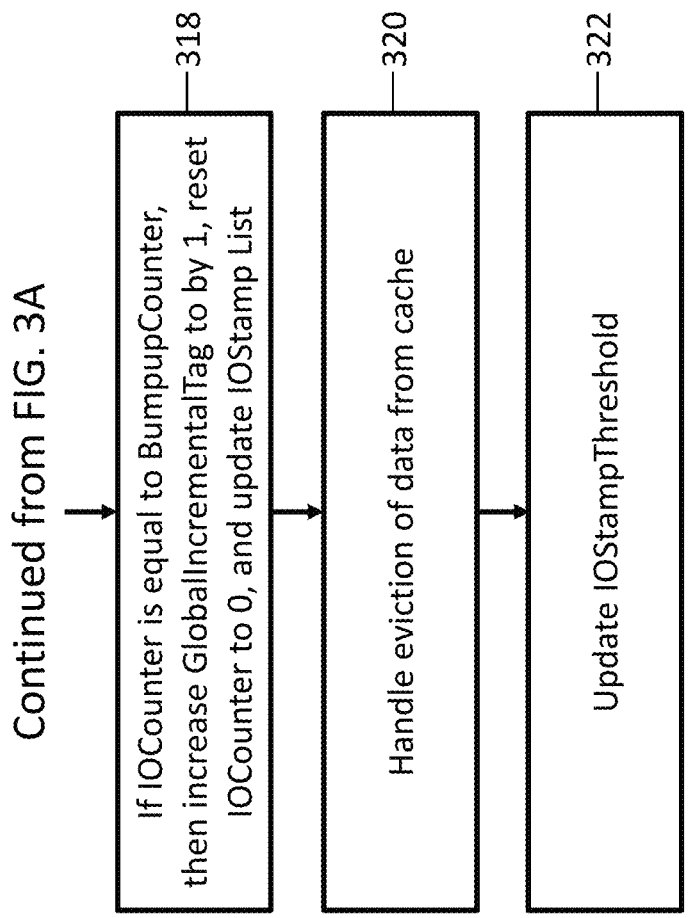

FIGS. 3A-3B illustrate a process in which a memory controller handles a memory access request in accordance with some embodiments of the present disclosure. Through this process, the memory controller 110 can maintain an updated IOStamp table and updated data for memory blocks 112, and also maintain sufficient information to identify target memory blocks. More particularly, when Z is the total number of memory blocks 112 in the cache 106, and W is the ratio between the number of target memory blocks and Z, this process allows the memory controller 110 to classify 1.5WZ memory blocks as target memory blocks (e.g., memory blocks are less recently used compared to the remaining memory blocks.)

In step 302, the memory controller 110 is configured to set several variables to be used for the modified LRU mechanism. More particularly, the memory controller 110 can reset the IOCounter and the GlobalIncrementalTag to 0, set the BumpUpCounter to WZ/2, and initialize the IOStamp table and the IOStamp list. The consequence of setting the BumpUpCounter to WZ/2 is further explained below. The initialization of the IOStamp Table can include an instantiation of a table having the same number of entries as the number of memory blocks 112, and setting the value of the entries to 0. The initialization of the IOStamp list can include instantiating a linked list having zero number of nodes (e.g., instantiating a pointer for the IOStamp list).

In step 304, the memory controller 110 can receive a memory access request from a host device. The memory access request can include a memory address to which the memory access request is targeted. The memory access request can include a memory-read request, requesting the storage system 104 to provide data stored at a particular memory address, or a memory-write request, requesting the storage system 104 to write data to a particular memory address. In step 306, the memory controller 110 can increase the IOCounter by 1.

In step 308, the memory controller 110 can analyze the memory address in the memory access request to determine whether the memory access request is associated with one or more memory blocks 112 in the cache 106. If the memory access request is associated with one or more memory blocks in the cache 106, the memory controller 110 can continue to steps 310 and 312; if not, the memory controller 110 can continue to steps 314 and 316.

In step 310, since the memory access request is associated with one or more memory blocks in the cache 106, the memory controller 110 can perform the requested memory access operation on the one or more memory blocks in the cache 106. For example, if the memory access request is a memory read request, the memory controller 106 can retrieve the data from the one or more memory blocks in the cache 106, and provide the retrieved data to the host device 102. As another example, if the memory access request is a memory write request, the memory controller 106 can write the data to the one or more memory blocks in the cache 106, as well as the associated memory blocks in the storage device 108.

In step 312, the memory controller 110 can update the IOStamp for the memory block associated with the memory access request. More particularly, the memory controller 110 can identify an entry of the IOStamp table associated with the memory block, and determine whether the IOStamp of the memory block is different from the current GlobalIncrementalTag. If so, the memory controller 110 sets the entry to be equal to the current GlobalIncrementalTag. Furthermore, the memory controller 110 can decrease, by one, the "NoOfBlocks" value of the IOStamp list node previously associated with the memory block. More particularly, the memory controller 110 can identify the previous IOStamp of the memory block, and identify the IOStamp list node associated with that previous IOStamp. To identify the IOStamp list node associated with that previous IOStamp, the memory controller 110 can scan nodes in the IOStamp list to identify the node I[i] such that the previous IOStamp is between I[i−1].IOStamp+1 and I[i].IOStamp, inclusive of both. Once the memory controller 110 identifies the IOStamp list node associated with that previous IOStamp, the memory controller 110 can reduce the "NoOfBlocks" value of the identified IOStamp list node by one.

The memory controller 110 can also determine whether any consecutive nodes in the IOStamp list should be merged. In some embodiments, the memory controller 110 can determine to merge two consecutive nodes of an IOStamp list, referred to as I[i] and I[i+1], when the number of memory block associated with the two consecutive nodes is smaller than the BumpUpCounter:

$$I[i].\text{NoOfBlocks}+I[i+1].\text{NoOfBlocks}<\text{BumpUpCounter}.$$

For the boundary condition of i=0, the memory controller 110 can determine to merge two consecutive nodes I[0] and I[1] when the number of memory blocks in the first node of the IOStamp list (i.e., I[0].NoOfBlocks) is smaller than the desired number of target memory blocks. For example, suppose Z is the total number of memory blocks 112 in the cache 106, and W is the ratio of the number of target memory blocks to Z. The memory controller 110 is configured to determine whether the number of memory blocks in the first node of the IOStamp list is smaller than WZ:

$$I[0].\text{IOStamp}<WZ$$

If so, the memory controller 110 can set the IOStampThreshold to be the IOStamp of the second node (i.e., IOStampThreshold=I[1].IOStamp), and merge I[0] and I[1]. Since the memory controller 110 sets the BumpUpCounter as WZ/2, this node merging scheme can ensure that the number of memory blocks with the IOStamp less than or equal to the IOStamp of the first node (i.e., I[0].IOStamp) is always in the range of:

$$WZ<(\text{number of memory blocks with IOStamp}<=I[0].\text{IOStamp})<1.5WZ$$

The memory controller 110 can use this characteristic to set the IOStampThreshold based on I[0].IOStamp, as discussed further below.

If the memory controller 110 decides to merge two consecutive nodes of an IOStamp list, referred to as I[i] and I[i+1], then the memory controller 110 can set the IOStamp of the merged node I'[i] (e.g., I'[i].IOStamp) to be the highest IOStamp of the nodes being merged (e.g., I[i+1].IOStamp,) set the NoOfBlocks of the merged node I'[i] (e.g., I'[i].NoOfBlocks) to be the sum of NoOfBlocks of the nodes being merged (e.g., I[i].NoOfBlocks+I[i+1].NoOfBlocks,) and re-index the nodes in the IOStamp list so that, for all nodes having the index j higher than i, I'[j]=I[i+1].

In step 314, since the memory access request is not associated with any of the memory blocks 112 in the cache 106, the memory controller 110 can relay the memory access request to the storage device 108 so that the requested memory access operation is performed at the storage device 108.

In step 316, the memory controller 110 can update the cache 106 so that the cache 106 can maintain the data transferred between the host device 102 and the storage device 108. For example, if the memory access request was a memory-read request, then the data retrieved from the storage device 108 can be stored in one or more memory blocks 112 so that if the host device 102 requests the same data again, the memory controller 110 can provide the data without accessing the storage device 108. Likewise, if the memory access request was a memory-write request, then the data written into the storage device 108 can also be stored in one or more memory blocks 112 so that if the host device 102 requests that data, the memory controller 110 can provide the data without accessing the storage device 108.

In some cases, all memory blocks 112 may be full (e.g., all memory blocks 112 could already be storing data). In such cases, the memory controller 110 can select one of the less recently used memory blocks (e.g., target memory blocks), evict data from the selected memory block, and write new data (e.g., the data retrieved from the storage device 108 or the data written into the storage device 108) into the selected memory block.

In step 318, the memory controller 110 can determine whether the IOCounter is equal to BumpupCounter. If the IOCounter is equal to BumpupCounter, then the memory controller 110 is configured to reset the IOCounter to 0. Also, the memory controller 110 can be configured to add a node to the IOStamp list corresponding to the GlobalIncrementalTag. For example, suppose that an IOStamp list is an array of five nodes, referenced as I[i], i=0 . . . 4. If the IOCounter is equal to BumpupCounter, then the memory controller 110 can add I[5] to the IOStamp list, where I[5].IOStamp is set to GlobalIncrementalTag and I[5].NoOfBlocks is set to BumpupCounter (since the memory controller 110 has assigned the GlobalIncrementalTag as the IO stamp to "BumpupCounter" number of memory blocks.) Subsequently, the memory controller 110 can increase the GlobalIncrementalTag by 1. In some embodiments, step 318 can be performed between step 306 and step 308.

In step 320, when the memory controller 110 evicts data from a memory block in the cache, the memory controller 110 can decrease, by one, the "NoOfBlocks" value of the IOStamp list node associated with the memory block. More particularly, the memory controller 110 can identify the IOStamp of the memory block, and identify the IOStamp list node associated with that IOStamp. To identify the IOStamp list node associated with that IOStamp, the memory controller 110 can scan nodes in the IOStamp list to identify the node I[i] such that the IOStamp is between I[i−1].IOStamp+1 and I[i].IOStamp, inclusive of both. Once the memory controller 110 identifies the IOStamp list node associated with that IOStamp, the memory controller 110 can reduce the "NoOfBlocks" value of the identified IOStamp list node by one.

In step 322, the memory controller 110 is configured to update the IOStampThreshold. Since the first node of the IOStamp list may have been merged with the second node of the IOStamp list, the memory controller 110 can update the IOStampThreshold to be the IOStamp of the first node in the IOStamp list (i.e., I[0].IOStamp).

Figure 4:
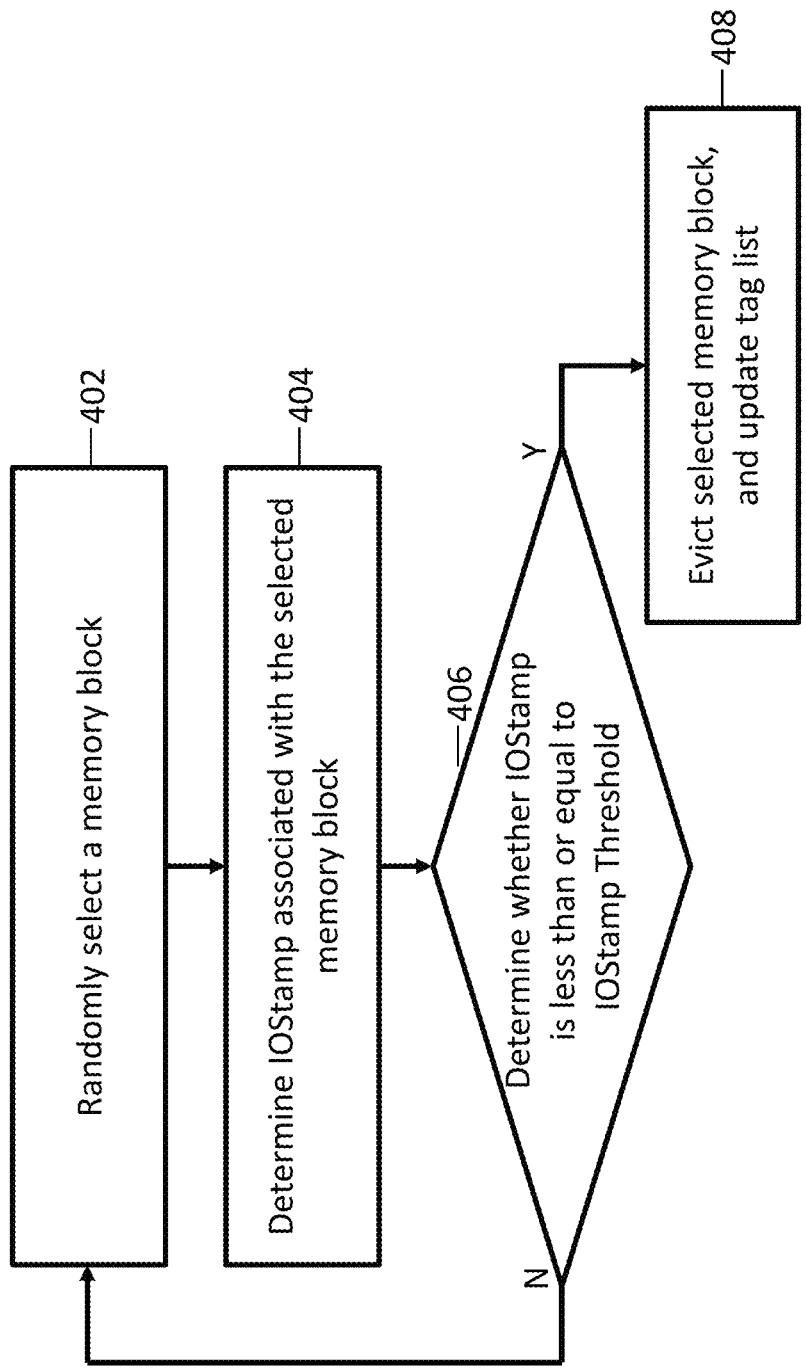
FIG. 4 illustrates a process for selecting one of less recently used memory blocks in accordance with some embodiments of the present disclosure.

In some embodiments, the memory controller 110 can use these variables to select one of the target memory blocks through random sampling. FIG. 4 illustrates a process for selecting one of target memory blocks in accordance with some embodiments of the present disclosure. In step 402, the memory controller 110 can randomly select a memory block. For example, the memory controller 110 can use a random number generator to randomly generate a memory block identifier. In step 404, the memory controller 110 can retrieve an entry of the IOStamp table associated with the selected memory block to determine the IOStamp of the selected memory block.

In step 406, the memory controller 110 can determine whether the IOStamp of the selected memory block is less than or equal to the IOStampThreshold. If the IOStamp of the selected memory block is not less than or equal to the IOStampThreshold, then the memory controller 110 can move to step 402 and iterate the steps 402-406. If the IOStamp of the selected memory block is less than or equal to the IOStampThreshold, then the memory controller 110 can move to step 408.

In step 408, the memory controller 110 can evict data from the selected memory block. Furthermore, the memory controller 110 can update the IOStamp list to reflect the eviction of data in the selected memory block. More particularly, the memory controller 110 can decrease, by one, the number of memory blocks associated with the first node in the IOStamp list (i.e., I[0].NoOfBlocks) to reflect that the selected memory block is evicted. Also, the memory controller 110 can determine if it should merge the first two nodes of the IOStamp list (i.e., I[0] and I[1]), based on the merge rule discussed with respect to step 312.

Once the memory controller 110 evicts data from a memory block, the memory controller 110 can use that memory block to accommodate new data.

In some embodiments, the GlobalIncrementalTag is 32-bit long. Such a GlobalIncrementalTag would be long enough in practical scenarios. For example, suppose that the total size of the memory blocks 112 is 64 GB, and the block size is 4 KB. Therefore, the total number of memory blocks 112 is 16 million. Suppose, also, that the ratio between the number of target memory blocks and the total number of memory blocks 112 (W) is 0.01. In this case, the BumpUpCounter would be set as 80,000. Therefore, the number of input/output operations before the memory controller 110 overflows the 32-bit GlobalIncrementalTag is $2^{32} \times 80,000 = 0.32$ peta input/output operations, which would amount to $4092 \times 0.32$ Petabyte of data transfer. Assuming that the cache has a speed of 1 GB per second, the amount of time before the memory controller 110 overflows the 32-bit GlobalIncrementalTag is approximately 43 years. Since the lifetime of a cache 106 is likely to be shorter than 43 years, 32 bits should be sufficient to represent the GlobalIncrementalTag in practical scenarios.

In some embodiments, the ratio between the number of target memory blocks and the total number of memory blocks 112 (W), which can be configured by the operator of the cache 106, can play an important role. As discussed earlier, W can determine the value of the BumpUpCounter, which, in turn, can determine the number of target memory blocks. Therefore, as W becomes small, the performance of the modified LRU mechanism can become more similar to that of the traditional LRU mechanism, but it would take a larger number of iterations in FIG. 4 to identify a target memory block for eviction.

In some embodiments, the memory controller 110 can be configured to automatically adjust W depending on the number of iterations needed to select a target memory block in FIG. 4. For example, when the number of iterations needed to select a target memory block is small, the memory controller 110 can reduce W so that the performance of the modified LRU mechanism closely tracks that of the traditional LRU mechanism. In contrast, when the number of iterations needed to select a target memory block is large, the memory controller 110 can increase W so that the memory controller 110 can select a target memory block in a smaller number of iterations. In effect, the adjustment of W can modify the BumpUpCounter and/or the IOStampThreshold, thereby controlling the number of iterations needed to select a target memory block.

Where reference is made herein to a method comprising two or more defined steps, the defined steps can be carried out in any order or simultaneously (except where the context would indicate otherwise), and the method can include one or more other steps which are carried out before any of the defined steps, between two of the defined steps, or after all the defined steps (except where the context would indicate otherwise).

Those of skill in the art would appreciate that various illustrations described herein may be implemented as electronic hardware, computer software, firmware, or combinations of two or more of electronic hardware, computer software, and firmware. To illustrate this interchangeability of hardware, software, and/or firmware, various illustrative blocks, modules, elements, components, methods, and algorithms have been described above generally in terms of their functionality. Whether such functionality is implemented as hardware, software, firmware, or a combination depends upon the particular application and design constraints imposed on the overall system. Skilled artisans may implement the described functionality in varying ways for each particular application. Various components and blocks may be arranged differently (for example, arranged in a different order, or partitioned in a different way) all without departing from the scope of the subject technology. An implementation of the disclosed subject matter can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The disclosed subject matter can also be embedded in a computer program product, which comprises all the features enabling the implementation of the methods and systems described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, the systems and methods described herein may also be embodied in other specific forms without departing from the spirit or essential attributes thereof, and accordingly, reference should be had to the following claims, rather than to the foregoing specification, as indicating the scope of the systems and methods.

The present disclosure has been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A method comprising:
receiving, at a memory controller in a storage system coupled to a host device via an interface, a memory access request, wherein the memory access request comprises a memory block identifier that identifies a memory block;
determining, at the memory controller, that data associated with the memory access request should be stored in one of memory blocks in the cache and that each of the memory blocks in the cache is already occupied with valid data;
selecting, by the memory controller, one of the memory blocks;
determining a first transaction count associated with the selected memory block, wherein the first transaction count is indicative of a time instance at which the selected memory block was accessed; and
when the first transaction count satisfies a predetermined criterion, causing, by the memory controller, the selected memory block to store the data, and
when the first transaction count does not satisfy the predetermined criterion, selecting, by the memory controller, another one of the memory blocks until the memory controller selects a memory block whose transaction count satisfies the predetermined criterion and
maintaining a transaction count list having at least one entry, wherein the at least one entry is indicative of a number of memory blocks having a transaction count that is within a preconfigured range; and
determining a transaction count threshold based on the number of memory blocks having a transaction count that is within the preconfigured range.

2. The method of claim 1, wherein selecting the one of the memory blocks comprises selecting a memory block identifier using a random number generator.

3. The method of claim 1, further comprising maintaining the transaction count threshold, and wherein the first transaction count satisfies the predetermined criterion when the first transaction count satisfies a predetermined condition with respect to the transaction count threshold.

4. The method of claim 3, wherein the first transaction count satisfies the predetermined condition with respect to the transaction count threshold when the first transaction count is less than the transaction count threshold.

5. The method of claim 3, wherein when an average number of iterations used for identifying the selected memory block is small, causing a modification of the transaction count threshold to reduce a number of memory blocks that satisfy the predetermined criterion.

6. The method of claim 1, further comprising:
receiving a parameter indicative of a number of memory blocks that satisfy the predetermined criterion; and
determining the preconfigured range based on the parameter.

7. The method of claim 1, further comprising:
receiving, at the memory controller, a first memory access request, wherein the first memory access request comprises a first memory block identifier that identifies a first memory block;
determining, at the memory controller, that data associated with the first memory access request is already stored in one of memory blocks in the cache; and
updating a transaction count of the one of memory blocks in the cache to reflect the first memory access request.

8. The method of claim 1, further comprising identifying an entry of the transaction count list associated with the first memory block, and updating the number of memory blocks in the entry to reflect the first memory access request.

9. A storage system comprising:
a cache comprising a plurality of memory blocks for maintaining data; and a memory controller configured to process a memory access request received from a host device, wherein the memory access request comprises a memory block identifier that identifies a memory block, wherein the memory controller is further configured to:
- determine that data associated with the memory access request should be stored in one of memory blocks in the cache and that each of the memory blocks in the cache is already occupied with valid data;
- select one of the memory blocks in the cache;
- determine a first transaction count associated with the selected memory block, wherein the first transaction count is indicative of a time instance at which the selected memory block was accessed; and
- when the first transaction count satisfies a predetermined criterion, cause the selected memory block to store the data, and
- when the first transaction count does not satisfy the predetermined criterion, select another one of the memory blocks until the memory controller selects a memory block whose transaction count satisfies the predetermined criterion; and
- maintain a transaction count list having at least one entry, wherein the at least one entry is indicative of a number of memory blocks having a transaction count that is within a preconfigured range; and
- determine a transaction count threshold based on the number of memory blocks having a transaction count that is within the preconfigured range.

10. The storage system of claim 9, wherein the memory controller is configured to select a memory block identifier using a random number generator.

11. The storage system of claim 9, wherein the first transaction count satisfies the predetermined criterion when the first transaction count satisfies a predetermined condition with respect to the transaction count threshold.

12. The storage system of claim 11, wherein when an average number of iterations used for identifying the selected memory block is small, the memory controller is configured to cause a modification of the transaction count threshold to reduce a number of memory blocks that satisfy the predetermined criterion.

13. The storage system of claim 9, wherein the memory controller is configured to:
- receive a parameter indicative of a number of memory blocks that satisfy the predetermined criterion; and
- determine the preconfigured range based on the parameter.

14. The storage system of claim 9, wherein the memory controller is configured to:
- receive a first memory access request, wherein the first memory access request comprises a first memory block identifier that identifies a first memory block;
- determine that data associated with the first memory access request is already stored in one of memory blocks in the cache; and
- update a transaction count of the one of memory blocks in the cache to reflect the first memory access request.

15. A non-transitory computer readable medium having executable instructions operable to cause a memory controller to:
- receive a memory access request from a host device over an interface, wherein the memory access request comprises a memory block identifier that identifies a memory block;
- determine that data associated with the memory access request should be stored in one of memory blocks in the cache and that each of the memory blocks in the cache is already occupied with valid data;
- select one of the memory blocks in the cache;
- determine a first transaction count associated with the selected memory block, wherein the first transaction count is indicative of a time instance at which the selected memory block was accessed; and
- when the first transaction count satisfies a predetermined criterion, cause the selected memory block to store the data, and
- when the first transaction count does not satisfy the predetermined criterion, select another one of the memory blocks until the memory controller selects a memory block whose transaction count satisfies the predetermined criterion; and
- maintain a transaction count list having at least one entry, wherein the at least one entry is indicative of a number of memory blocks having a transaction count that is within a preconfigured range; and
- determine a transaction count threshold based on the number of memory blocks having a transaction count that is within the preconfigured range.

16. The computer readable medium of claim 15, wherein the first transaction count satisfies the predetermined criterion when the first transaction count satisfies a predetermined condition with respect to the transaction count threshold.

17. The computer readable medium of claim 15, further comprising executable instructions operable to cause the memory controller to:
- receive a first memory access request, wherein the first memory access request comprises a first memory block identifier that identifies a first memory block;
- determine that data associated with the first memory access request is already stored in one of memory blocks in the cache;
- update a transaction count of the one of memory blocks in the cache to reflect the first memory access request.

* * * * *